Fig. 2

UNITED STATES PATENT OFFICE.

PHILIP G. DARLING, OF WILMINGTON, DELAWARE, ASSIGNOR, BY MESNE ASSIGN-MENTS, TO E. I. DU PONT DE NEMOURS AND COMPANY, A CORPORATION OF DELAWARE.

APPARATUS FOR OBTAINING SALTS FROM SALT-BEARING ORES.

1,283,099.  Specification of Letters Patent.  Patented Oct. 29, 1918.

Application filed July 17, 1914. Serial No. 851,487.

*To all whom it may concern:*

Be it known that I, PHILIP G. DARLING, of Wilmington, in the county of New Castle, and in the State of Delaware, have invented a certain new and useful Improvement in Apparatus for Obtaining Salts from Salt-Bearing Ores; and do hereby declare that the following is a full, clear, and exact description thereof.

My invention relates to an apparatus for the recovery of salts from salt bearing ores, but it is to be understood that it has application to the recovery of soluble constituents from any mixture containing soluble as well as insoluble components. It is particularly applicable, however, to the recovery of sodium nitrate from caliche.

The object of my invention is to provide an apparatus which has many advantages over previous apparatus used for the recovery of soluble constituents of the character indicated. The particular advantages of the same will appear from a consideration of my apparatus as hereinafter set forth in detail.

While my invention is capable of being carried out in many different ways and while many different forms of apparatus may be used for carrying out my invention, for the purpose of illustration, I have shown only one form of my apparatus in the accompanying drawings, in which, Figures 1 and 1ª are, together, a side elevation, partly in section, of a complete apparatus embodying my invention;

Fig. 3 is a section of Fig. 1 on the line 3—3;

Fig. 7 is a front elevation of Fig. 1; and

Figure 1:
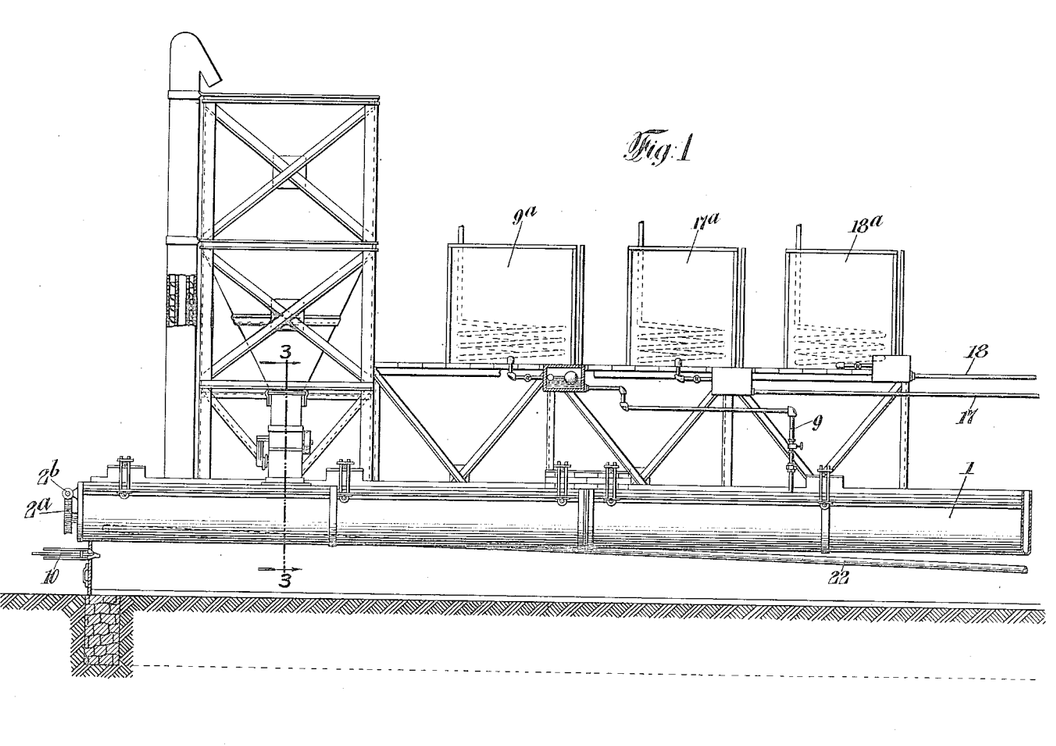
Figures 1A, 3:
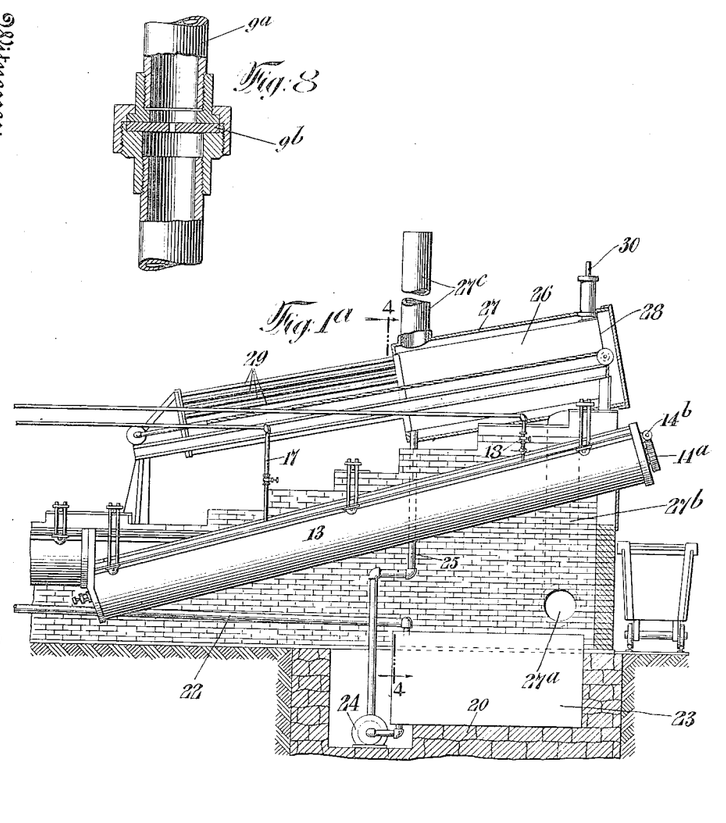
Figure 2:
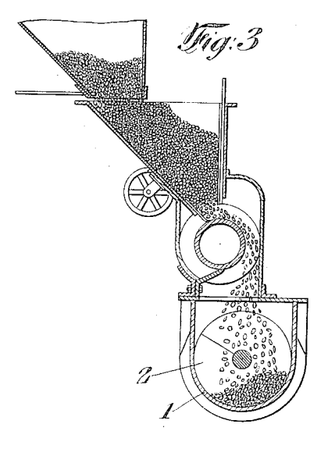
Fig. 2 is a front end elevation of Fig. 1, the ore feeder being shown in section.
Figure 4:
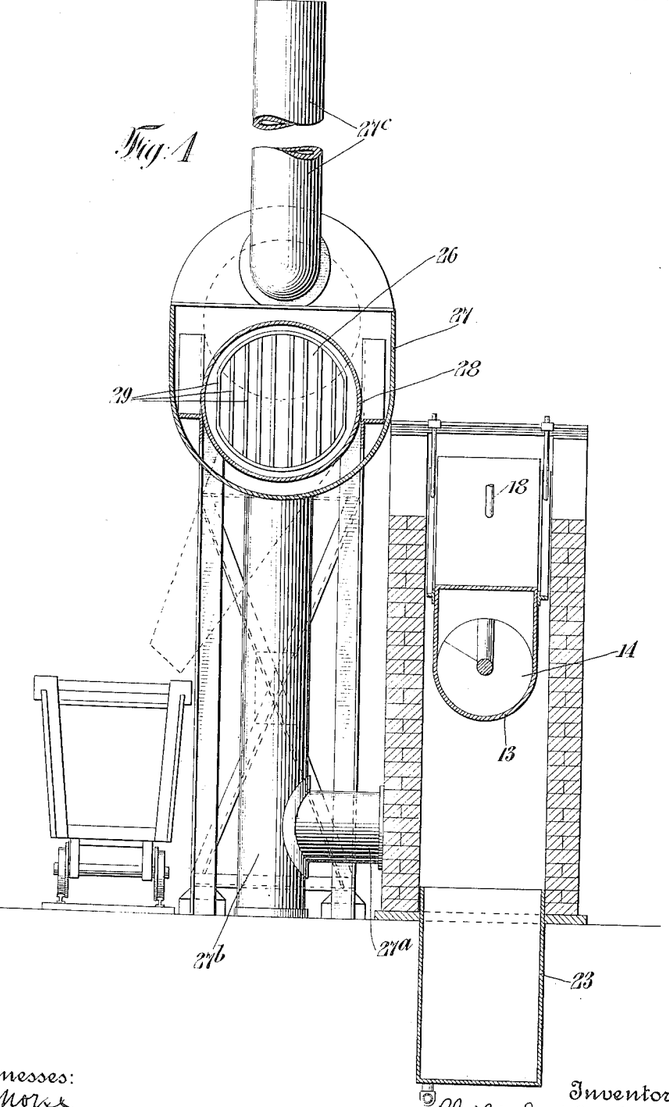
Fig. 4 is a section of Fig. 1ª on the line 4—4.

In the drawings I have shown a main dissolving trough preferably set on masonry walls so as to form a combustion and heating chamber between the walls and beneath the said trough. The trough 1 has a screw conveyer 2 therein, which may be driven in any desired manner from any suitable source of power. I have, however, shown a worm wheel 2ª and a worm 2ᵇ for this purpose. The screw conveyer has a plurality of apertures 3 passing through the blades of the same, so as to permit the liquids in the trough to flow in an opposite direction to the solids therein. The apertures 3 are located in staggered relation so that the flow of the liquid will be momentarily arrested at different points in the trough 1. The solid caliche is fed into the trough at a point near the front end of the trough, as shown, from some type of ore feeder, so incased as to prevent the direct escape of steam from the trough. Mother liquor for dissolving the soluble constituents from the caliche is fed into the trough 1 by means of a pipe 9, which may be located at any point found most desirable, preferably toward the rear end of the trough 1 and preferably in the top of the trough 1. The mother liquor is contained in a tank 9ª, for instance, and its flow is regulated preferably as by interposing a diaphragm 9ᵇ in such pipe, the said diaphragm being provided with an opening therein calibrated to pass only the desired quantity of liquor. The trough 1 is maintained at an elevated temperature, preferably by means of a burner 10 which may be an oil burner and is located beneath the same and extends into the combustion chamber before mentioned. The products of combustion are carried off by a stack at the rear end of the apparatus as will be later described. The solid materials which are undissolved by the mother liquor in the trough 1, are conveyed to the end of the trough 1 at the right of Fig. 5 until they are discharged therefrom into an inclined trough 13, having a screw conveyer 14, whose screw 15 is preferably in the form of a ribbon surrounding but largely spaced away from the shaft. The conveyer 14 may also be driven in any desired manner from any suitable source of power. I have, however, shown a worm wheel 14ª, and a worm 14ᵇ, for this purpose. From this point the solid materials are conveyed upwardly along the trough 13, until they are discharged through an outlet 16, at the upper end thereof, and in the present instance are shown as being discharged into a car to be taken away. A pipe 17, preferably equipped like the pipe 9, and supplied from a tank 17$^a$ is provided for discharging wash water upon the ascending solids in the trough 13, so that the undissolved nitrate and the mother liquor carried thereby, which has not drained out, may be washed out of the same as far as possible. Pure water may be introduced near the upper end of the inclined trough through a pipe 18 supplied from a tank 18$^a$. The liquid feed level from all the tanks may be regulated in any desired manner as by the simple orifice disk and ball cock. Between the trough 1 and the trough 13, there is located a gate 19, which, in order to prevent the escape of the steam from the trough 1, has its lower end sealed in the body of liquid within the apparatus. A similar gate 19$^a$ is located at the other end of trough 1 for the same purpose. The liquid in the trough 1, as previously indicated, passes through the trough 1 in the opposite direction to the movement of the solids therein, and the said liquid containing the dissolved nitrate passes outwardly from the end of the trough 1, over a lip 20, and into a trough 21 out of which it flows through a pipe 22 into a reservoir 23 beneath the inclined trough 13. The reservoir 23 is preferably built between the masonry walls sustaining the troughs 1 and 13, and such reservoir extends preferably to the rear end of the said walls, beneath the trough 13. A pump 24 (shown in the present instance as a centrifugal pump) raises the liquor from the tank 23 to a filter press. As the liquor will normally be hot, the pump is set low enough so that the liquor can flow by gravity into the pump. The liquor rises from the pump through a pipe 25 and enters a filter press 26 erected beside the upper end of the trough 13. For the purpose of keeping the filter press hot, it is inclosed in a jacket 27 to which the gases of combustion are conveyed from the combustion and heating chamber (formed by the troughs 1 and 13 and their supporting masonry) the gases being conveyed by pipes 27$^a$ and 27$^b$, and the gases after passing through the jacket 27 and around the filter press, escape by a stack 27$^c$. The pressure filter may be constructed in any desired manner, but as shown in the drawings, I have made use of a well-known type of filter comprising an outer casing 28, having a plurality of filter leaves 29 comprising cores made preferably of a plurality of layers of woven wire and covered preferably with woven duck or canvas cloth. Each of the cores is connected to an air inlet pipe and to a liquid discharging pipe. In the illustrated press, the filter leaves are mounted on a frame that is supported on a track so that the leaves may be drawn out of the casing in discharging. In Fig. 1$^a$ the leaves are shown withdrawn from the casing 28 in position for discharging the cakes. In Fig. 4 they are shown in the casing in position for the formation of the cake. The cake which accumulates upon the filter leaves is discharged from the leaves 29 in any suitable manner and may after removal from the leaves not be submitted to any further treatment in the apparatus, but is discharged, for instance, by a spout (shown in dotted lines in Fig. 4) into a car to be taken away.

Figure 5:
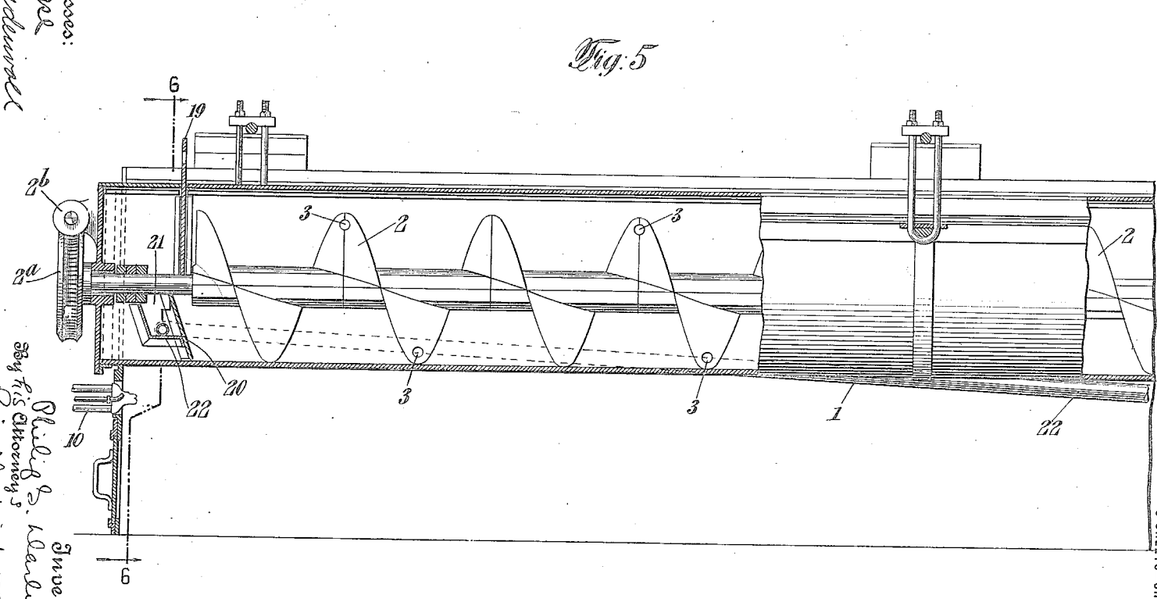
Figs. 5, 5ª and 5ᵇ together form an enlarged vertical sectional view of the troughs 1 and 13 and adjacent parts, some of the parts being shown in elevation.
Figure 5A:
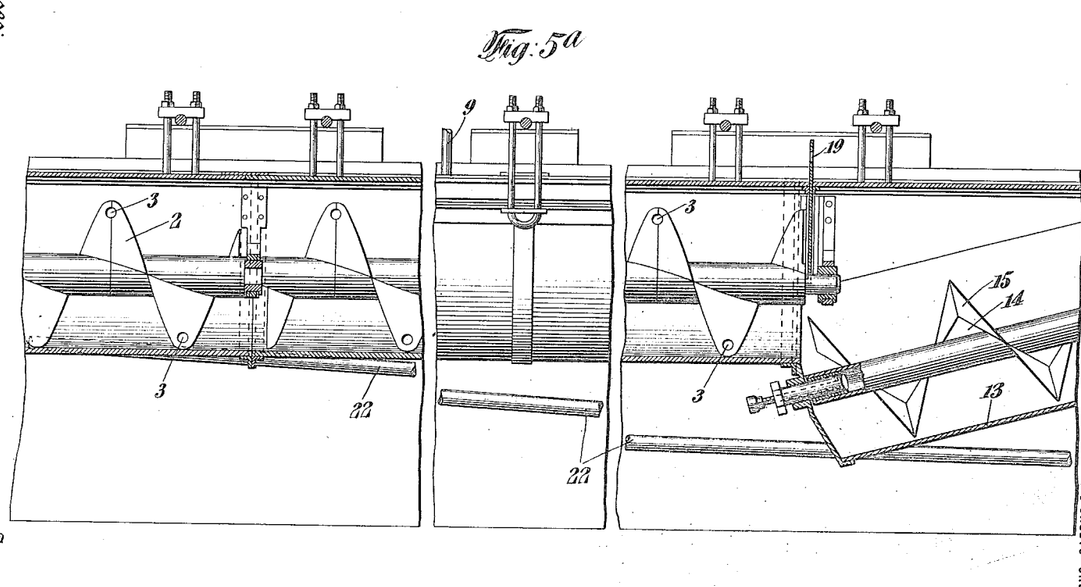
Figure 5B:
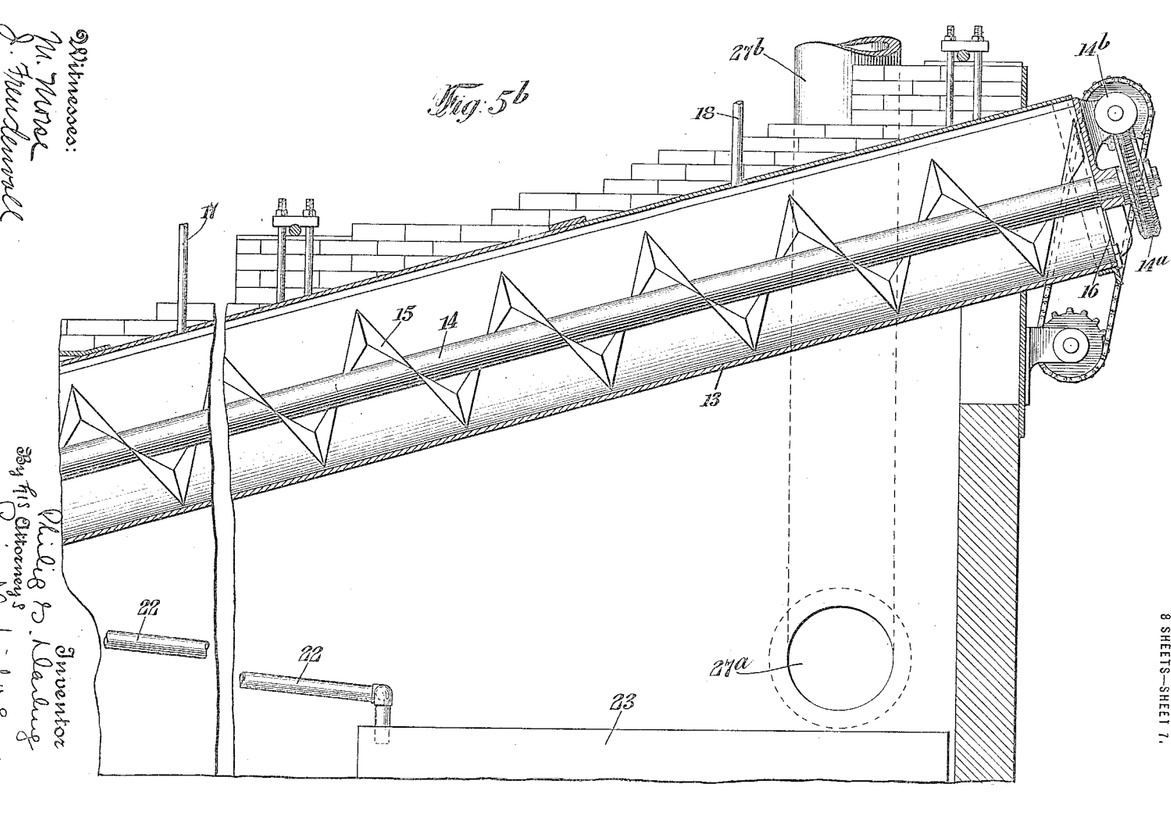
Figure 6:
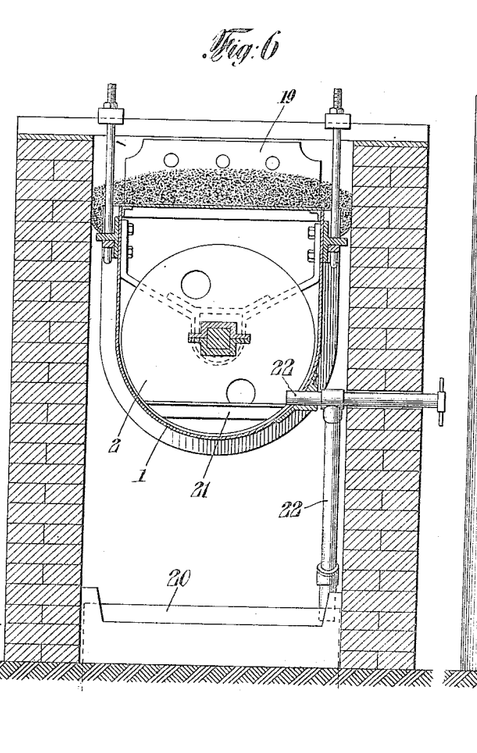
Fig. 6 is a section on the line 6—6 of Fig. 5.
Figure 8:
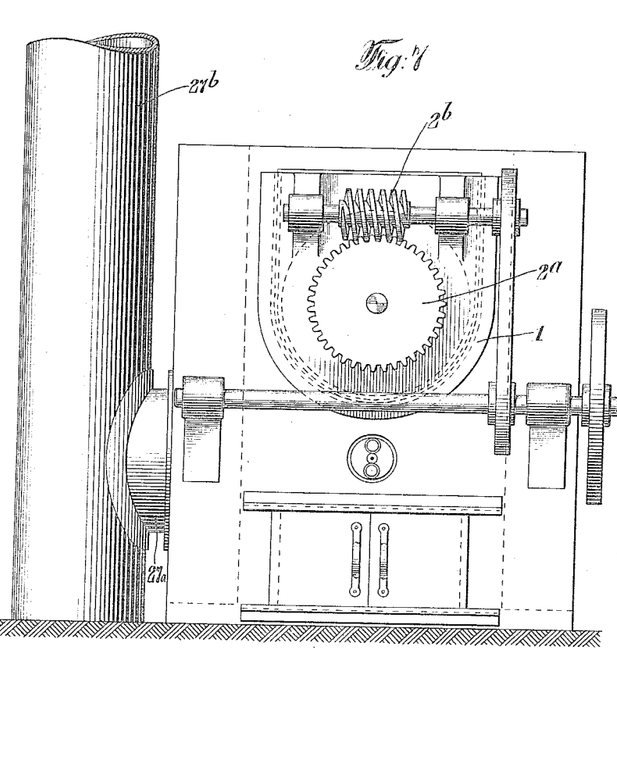
Fig. 8 is a sectional view showing the perforated disk arrangement for regulating the feed of the fluid.

In the operation of my invention as carried out in the apparatus already described: The burner 10 being lighted and maintaining the materials at substantially the boiling point of water, a supply from the wash water and mother liquor tanks being furnished through their respective pipes, and the ore feeding machine being supplied with caliche, the process will proceed as follows: The mechanical arrangement of the ore feeding parts is such as to prevent the escape of steam from the trough 1. The escape of steam is, furthermore, prevented, owing to the fact that when the steam comes into contact with the entering body of caliche, the temperature of the caliche will result in condensing the steam with which it has come into contact. It is advantageous to prevent the escape of steam in order to maintain, as much of the same body of dissolving liquor as possible continuously in the circulating system of the apparatus and also to prevent the escape of heat. Furthermore, the contact of the steam with the body of caliche being fed into the apparatus, will tend to pre-heat the caliche. From this point the caliche will be conveyed along the trough 1, by the conveyer 2, toward the other end thereof. At the same time, a current of mother liquor is flowing along the trough in the opposite direction, said mother liquor passing through the apertures 3 in the conveyer 2. As previously pointed out, the staggered position of the apertures 3 will momentarily retard the current of mother liquor at various points in the trough 1, so as to permit an effective solvent action upon the caliche. During the rotation of screw 2, its end edge (as shown in Fig. 5) constitutes a wiper which passes down past the top edge of the lip 20, tending to wipe down and away from the top of this lip, any sand or coarse slime which might otherwise overflow with the liquid. In this way, the percentage of slime which overflows with the liquid discharged, is reduced. The burner 10, providing a current of heated air and products of combustion within the combustion and heating chamber beneath the troughs 1 and 13 will provide the desired amount of heat to permit an effective solution of the soluble constituents by the mother liquor. As previously indicated, the heated air and products of combustion pass outwardly through the stack. The level of the current of liquid within the trough is maintained at approximately the center line of the screw. It is still necessary to remove the finer particles of solids, which are present in the form of a slime in the liquid and this is accomplished by passing the liquid subsequently through the pressure filter 26. The liquid which flows into the reservoir 23 beneath the tanks 1 and 13 is withdrawn therefrom by the pressure pump 24, from which it is conveyed under a pressure of preferably 40 to 80 lbs. through the pipe 25 from the pressure filter. The temperature of the liquid in the filter 26 should be substantially the same as its temperature when leaving the trough 1. The liquid having been conveyed into the pressure filter 26, the pressure from the pump 24 causes the liquid to pass inwardly through the leaves of the filter, depositing upon the outside of the same, the remaining slime carried by the liquid, which gradually accumulates upon the leaves of the filter to form a cake. When the cake has acquired its maximum thickness, as predetermined, the filter chamber is disconnected from the pump supply and the solution or pulp in the filter chamber about the cake is allowed to run back into the solution reservoir. To prevent the cake falling from the leaves when this solution is removed compressed air, with a pressure approximately equal to that used in the filter when building the cake, is admitted from pipe 30 to displace the solution. After the removal of this solution the filter is filled with clear wash water, also under pressure, which is slowly forced through the filter cake, discharging from the inside of the leaves for a predetermined period. This liquid discharge contains in solution the salt recovered from the washing of the cake. The water is then shut off, the excess is drained from the filter, the filter is opened, the leaf rack is run out as shown in Fig. 1, and the cake is discharged from the leaves by admitting a little water or steam or air to the inside of the leaves, which flushes or blows the cake off. This cake is then thrown away, the filter is closed and operated through another similar cycle. The action of the pressure pump, together with the pressure filter, is such as to not decrease the temperature of the liquid, but rather to increase the same. This is advantageous, inasmuch as a decrease in temperature of the liquid might result in the deposition of some of the nitrate from the liquid in the filter.

The solids passing upwardly through the trough 13 are subjected to the action of a current of wash water passing into the trough 13 from the pipes 18 and 17. The current of wash water is also by this means, heated on its coming into contact with the heated ore, which has been discharged from the trough 1. The solids are then conducted upwardly along the trough 13 by means of the conveyer 14, the solids being gradually drained as they pass upwardly and the liquid therefrom flowing downwardly and joining the main body of liquid within the trough 1. The solids which have thus been washed and drained are finally conveyed to the upper end of the inclined trough 13, and are discharged through the outlet grid opening 16. The filtered liquid which passes outwardly through the discharge pipe of the pressure filter is conveyed to any suitable apparatus to permit the liquid to cool so as to allow the nitrate and other dissolved compounds to be deposited therefrom and the mother liquor obtained after the deposition of the solids is conducted to the liquid supply tank 9$^a$, from which it is conveyed into the apparatus in the manner already described.

There are many advantages which occur in the operation of my invention. By preventing the escape of steam, there is a great saving, owing to the fact that the escape of heat is prevented and owing to the fact that the same amount of water is continuously circulated in the apparatus, as far as possible. It will be seen that the apparatus operates continuously and automatically, thus producing a saving in labor and avoiding losses due to repeated handling. By means of my invention, the recovery of nitrate from caliche can be economically carried out in a very rapid manner by the operation upon the finely divided ore. In previous processes, it has been found necessary to treat the ore in the form of lumps of considerable size, in order to prevent the formation of slime in the liquid which could not be adequately removed. If in previous apparatus, the caliche were treated in a comminuted form, there would be a large amount of slime carried away with the liquid and if the nitrate were to be allowed to deposit under such circumstances, a large amount of slime would be deposited with the nitrate in such a manner that the nitrate and slime could not thereafter be readily separated. The use of large lumps of ore caused a considerable amount of waste and an additional amount of labor was necessary in obtaining and sorting the lump ore. In my apparatus, however, the caliche in comminuted form may be operated upon, owing to the fact that the slime present therein is effectively and rapidly removed by means of the pressure filters. As previously pointed out, the use of pressure filters prevents the deposition of the dissolved solids during the filtration. Furthermore, in my apparatus, the ore and liquid are intimately mixed owing to the plowing action of the conveyers and owing to the reverse directions of flow of the ore and the liquid. The arrangement of the conveyer with the staggered openings is such also as to prevent the uninterrupted flow of the liquid without dissolving the soluble constituents of the ore. Again, there is a direct and efficient heating of the materials during solution, which heating is brought about at the point where the greatest dissolving action is taking place. There is also a very efficient washing of the exhausted ores not only of the cake in the filters but also of the remainder of the exhausted solids, which are discharged into the inclined wash and drain trough from the main horizontal trough in which most of the dissolving action takes place, inasmuch as there is not only washing in the filters themselves, but there may also be a further washing thereafter, both of the solids washed in the filters and also of the remainder of the exhausted solids which are retained in the trough in which the dissolving action takes place. A further advantage is the fact that the water drained from the exhausted solids, is conveyed back into the mother liquid. The pre-heating of both the mother liquor and the caliche is also a great advantage, especially in view of the fact that much of this pre-heating is effected directly in connection with the apparatus used for dissolving the soluble constituents. The treatment may be readily regulated by adjusting the amounts of ore or dissolving liquor feeds and the speeds of the conveying screws. It will also be seen that the various parts of the apparatus are readily accessible.

While I have described my invention in detail, I wish it to be understood that many changes may be made therein without departing from the spirit of my invention. It is to be particularly understood that any other type of feeding means for the caliche and for the liquids may be used, if found desirable. Furthermore, any other type of desired apparatus for draining or removing the remaining liquor from the exhausted ore and for discharging the exhausted ore, may be used if desired, within the scope of my invention, and any separate mechanism found desirable, may be used for this purpose. Again, it is to be understood, that the filters which are used, may be substituted by any other type of filter by which the results contemplated in my invention may be obtained and that said filters may be located at any desired place and that the cake from the filters may be discharged in any suitable manner, through any suitable outlet. Finally, it is of course to be understood, that any other suitable type of heating means may be used that is found to be desirable.

I claim:

1. In combination, a container, means for feeding solid and liquid thereto without the escape of vapors from the container, and means for removing solid and liquid therefrom without the escape of vapors from the container.

2. In combination, a container, means for feeding solid and liquid thereto without the escape of vapors from the container, comprising a solid feeding mechanism sealed by the solid being fed, and means for removing solid and liquid therefrom without the escape of vapors from the container.

3. In combination, a container, means for feeding solid and liquid thereto without the escape of vapors from the container, and means for removing solid and liquid therefrom without the escape of vapors from the container, comprising a liquid-sealed outlet through which the solid is removed.

4. In combination, a container adapted to contain a solid, and means for feeding a liquid through the same, and arresting the flow therein from time to time.

5. In combination, a container adapted to contain a solid, and means for feeding a liquid through the same and arresting the flow therein from time to time, comprising a screw conveyer having staggered openings in its blade.

6. In combination, a container, means for feeding solid and liquid thereto without the escape of vapors therefrom, and means for adjusting the relative quantities of solid and liquid so fed.

7. In combination, a container adapted to contain solid and liquid without the escape of vapors therefrom, a conveyer therein, and a conveyer mechanism adapted to convey the solid out of the container to drain the same.

8. In combination, a container adapted to contain solid and liquid without the escape of vapors therefrom, a conveyer therein and an inclined conveyer mechanism adapted to convey the solid out of the container to drain the same.

9. In combination, a container, means for continuously feeding solid and liquid thereto, and means for continuously removing solid and liquid therefrom without the escape of vapors from the container.

10. In combination, a container, means for continuously feeding solid and liquid thereto, and means for continuously removing solid and liquid therefrom at opposite ends of the container, without the escape of vapors from the container.

11. In combination, a container for liquid and solid having an outlet opening, an overflow lip located at said opening and a wiper for the outlet opening.

12. In combination, a container for liquid and solid having an outlet opening, an overflow lip located at said opening and a wiper for the outlet opening, comprising a screw conveyer having a spiral blade.

13. In combination, a container, means for conveying solid therein, means for supplying a body of solvent thereto without the escape of vapors therefrom, means for conducting the solid out of the container, on an incline, and means for supplying a washing solvent on said incline.

14. In combination, an elongated receptacle, means for feeding salt bearing ore into the receptacle near one end thereof, means for feeding liquid near the other end thereof and means for conveying the ore from the inlet end to the other end without the escape of vapors therefrom.

15. In combination, an elongated receptacle, means for continuously feeding salt bearing ore into the receptacle near one end thereof, means for continuously feeding a liquid near the other end thereof and means for continuously conveying the ore from the inlet end to the other end without the escape of vapors therefrom.

16. In combination, an elongated receptacle, means for feeding salt bearing ore into the receptacle near one end thereof, means for feeding liquid near the other end thereof, means for conveying the ore from the inlet end to the other end without the escape of vapors therefrom, and an elongated draining receptacle to receive the solid material discharged from the first mentioned receptacle.

17. In combination, an elongated receptacle, means for continuously feeding salt bearing ore into the receptacle near one end thereof, means for continuously feeding a liquid near the other end thereof, means for continuously conveying the ore from the inlet end to the other end without the escape of vapors therefrom, and an elongated draining receptacle to receive the solid material discharged from the first mentioned receptacle.

18. In combination, an elongated receptacle, means for feeding salt bearing ore into the receptacle near one end thereof, means for feeding liquid near the other end thereof, means for conveying the ore from the inlet end to the other end without the escape of vapors therefrom, an elongated draining receptacle to receive the solid material discharged from the first mentioned receptacle, and means for supplying a washing liquid to the solid.

19. In combination, an elongated receptacle, means for continuously feeding salt bearing ore into the receptacle near one end thereof, means for continuously conveying the ore from the inlet end to the other end without the escape of vapors therefrom, an elongated draining receptacle to receive the solid material discharged from the first mentioned receptacle, and means for supplying a washing liquid to the solid.

20. In combination, an elongated receptacle, means for feeding salt bearing ore into the receptacle near one end thereof, means for feeding liquid near the other end thereof, means for conveying the ore from the inlet end to the other end without the escape of vapors therefrom, an elongated draining receptacle to receive the solid material discharged from the first mentioned receptacle, and means for supplying a washing liquid to the solid in the draining receptacle.

21. In combination, an elongated receptacle, means for continuously feeding salt bearing ore into the receptacle near one end thereof, means for continuously feeding a liquid near the other end thereof, means for continuously conveying the ore from the inlet end to the other end without the escape of vapors therefrom, an elongated draining receptacle to receive the solid material discharged from the first mentioned receptacle, and means for supplying a washing liquid to the solid in the draining receptacle.

22. In combination, an elongated receptacle, having a heating means, means for feeding salt bearing ore into the receptacle near one end thereof, means for feeding a liquid near the other end thereof and means for conveying the ore from the inlet end to the other end without the escape of vapors therefrom.

23. In combination, an elongated receptacle having means for mixing a liquid and salt at least partially soluble therein, a heater for said receptacle, a pressure filter for receiving the resulting solution, and means for leading the exhaust from said heater to the pressure filter.

In testimony that I claim the foregoing I have hereunto set my hand.

PHILIP G. DARLING.

Witnesses:
HAMILTON BRADSHAW,
CHARLES E. ARNOLD.